United States Patent
Gibis

(10) Patent No.: US 8,984,660 B2
(45) Date of Patent: Mar. 17, 2015

(54) PORTABLE DATA CARRIER HAVING AN OPERATING ERROR COUNTER

(75) Inventor: Oliver Gibis, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 126 days.

(21) Appl. No.: 13/820,804

(22) PCT Filed: Sep. 8, 2011

(86) PCT No.: PCT/EP2011/004530
§ 371 (c)(1),
(2), (4) Date: Mar. 5, 2013

(87) PCT Pub. No.: WO2012/031761
PCT Pub. Date: Mar. 15, 2012

(65) Prior Publication Data
US 2013/0174283 A1    Jul. 4, 2013

(30) Foreign Application Priority Data

Sep. 8, 2010 (DE) .......................... 10 2010 044 687

(51) Int. Cl.

| | |
|---|---|
| *G06F 7/04* | (2006.01) |
| *G06F 11/00* | (2006.01) |
| *G06F 12/14* | (2006.01) |
| *G06F 11/30* | (2006.01) |
| *G06F 21/78* | (2013.01) |
| *G06F 21/55* | (2013.01) |
| *G06F 21/71* | (2013.01) |

(Continued)

(52) U.S. Cl.
CPC .............. *G06F 21/78* (2013.01); *G06F 21/558* (2013.01); *G06F 21/71* (2013.01); *G06F 21/86* (2013.01); *G06K 19/07309* (2013.01)
USPC ................ 726/34; 726/26; 713/189; 713/193

(58) Field of Classification Search
USPC ............................... 726/26, 34; 713/189, 193
See application file for complete search history.

(56) References Cited

U.S. PATENT DOCUMENTS

| 5,323,465 A | 6/1994 | Avarne |
|---|---|---|
| 6,971,025 B1 | 11/2005 | Droege et al. |

(Continued)

FOREIGN PATENT DOCUMENTS

| DE | 43 21 849 A1 | 1/1995 |
|---|---|---|
| DE | 195 48 903 A1 | 8/1996 |

(Continued)

OTHER PUBLICATIONS

Wolfgang Rankl; Wolfgang Effing: "Handbuch der Chipkarten", Hanser XP002663033, pp. 502-504 (1999).

(Continued)

*Primary Examiner* — Darren B Schwartz
(74) *Attorney, Agent, or Firm* — Workman Nydegger

(57) ABSTRACT

A method in a portable data carrier for safeguarding the data carrier against external attacks on the data carrier, wherein at least one counter is employed in the data carrier. A specified command is safeguarded such that it is executed by the data carrier only when the at least one counter lies in a specified values range. The at least one counter is decremented before an execution of the command and incremented only when the command has been executed without interruption. The at least one counter here is settable multiple times, in particular even after the issuance of the data carrier to a user.

13 Claims, 1 Drawing Sheet

(51) Int. Cl.
*G06F 21/86* (2013.01)
*G06K 19/073* (2006.01)

(56) References Cited

U.S. PATENT DOCUMENTS

| | | | | |
|---|---|---|---|---|
| 2001/0010331 A1* | 8/2001 | Hazard | ......................... | 235/380 |
| 2002/0124183 A1* | 9/2002 | Marinet et al. | ................. | 713/200 |
| 2005/0289270 A1* | 12/2005 | Modave | ......................... | 710/200 |
| 2006/0015938 A1* | 1/2006 | Wlodarczyk | ................... | 726/22 |
| 2006/0112436 A1* | 5/2006 | Modave | ......................... | 726/34 |
| 2011/0010775 A1* | 1/2011 | Modave et al. | ................. | 726/26 |
| 2011/0122694 A1* | 5/2011 | Modave et al. | .......... | 365/185.04 |

FOREIGN PATENT DOCUMENTS

| | | | |
|---|---|---|---|
| DE | 198 18 830 | A1 | 10/1999 |
| DE | 199 39 280 | A1 | 2/2001 |
| EP | 0 574 219 | A2 | 12/1993 |
| EP | 1 056 058 | A1 | 11/2000 |

OTHER PUBLICATIONS

Weingart et al: "Physical Security Devices for Computer Subsystems: A Survey of Attacks and Defenses", XP-001049140, vol. vol. 1965, pp. 302-317 (Aug. 17, 2000).
Wolfgang Rankl: "Abwehrmassnahem gegen Angriffe . . . " pp. 1-12 (May 25, 2009), with translated abstract.
Wolfgang Rank: "Chipkarten-Anwendungen" Hanser, pp. 86-88 (2006), with translated abstract.
International Search Report for PCT/EP2011/004530, Dec. 7, 2011.
International Preliminary Report on Patentability and Written Opinion for PCT/EP2011/004530, Mar. 21, 2013.

* cited by examiner

PORTABLE DATA CARRIER HAVING AN OPERATING ERROR COUNTER

BACKGROUND OF THE INVENTION

A. Field of the Invention

The present invention relates to a portable data carrier having an operating error counter and to a method for safeguarding a command in the data carrier by means of an operating error counter.

B. Related Art

Operating error counters are used in connection with portable data carriers, for example chip cards, for limiting the unauthorized carrying out of security-relevant commands with the aim of attaining security-relevant data of the data carrier. It is known here for example to limit the number of successive false inputs. If this number is overshot the data carrier is blocked. By means of an operating error counter it is also possible to recognize attacks of other kinds on arbitrary commands executed on the data carrier. If for example a computation executed by a command is disturbed by an external action on the data carrier with the aim of spying out secret data involved in the computation using the disturbed result, this can be recognized inside the data carrier by the computation being repeated before a result is output. The output of a computation result is effected only when both computations arrive at an identical result. Otherwise, an attack on one of the computations can be assumed, and a corresponding operating error counter records this attack.

However, an attacker executing a hereinabove described attack on a command of a data carrier, which has been stolen for example, can recognize by an analysis of certain data-carrier parameters, for example by the current consumption, whether the comparison of the two computation results yields identity or not. Thus, the attacker has the possibility to deactivate the data carrier by interrupting the power supply before the operating error counter can record the attack. In this way the attacker can suspend the operating error counter, as it were, and carry out the attack as often as he pleases.

For this reason a newer practice is to already decrement an operating error counter before the executing of the security-relevant command, starting out from a specified positive initial value, and to increment it only when the command has been executed without interruption. In this way a hereinabove described attack can be safely recognized by the operating error counter, because an incrementing of the counter no longer takes place upon an interruption of the power supply during the carrying out of the command. At the next call-up of the command the reading of the operating error counter is accordingly reduced by one. If it is provided that the command is executed in the data carrier only as long as the operating error counter has a positive value, the number of attacks on the command is limited by the initial value of the operating error counter. Extensive attacking of the command can be safely prevented in this way.

But this kind of operating error counter has disadvantages too. If the counter is set too high at the beginning, i.e. ordinarily during the manufacture of the data carrier, in the initialization or personalization phase, there is a risk of the attacker succeeding in an attack at least with a certain, non-negligible probability. The security of the data carrier is thereby lowered. If the initial value is set too low, on the other hand, there is a danger of the counter dropping below the permissible minimum value in the course of the operating time of the data carrier through occasional operating errors of an authorized user or through technical disturbances which for example cause an interruption of the power supply during the execution of the command, and of the data carrier being deactivated, without an attack having taken place. The reliability and lasting operability of the data carrier suffer.

The object of the present invention is to propose a method for safeguarding a data carrier by means of an operating error counter, which combines high security of the data carrier with a reliable and lasting operability of the same.

SUMMARY OF THE DISCLOSURE

In a method according to the invention in a portable data carrier for safeguarding the data carrier against external attacks on the data carrier, at least one counter is employed in the data carrier. A specified command is safeguarded here such that it is executed by the data carrier only when the at least one counter lies in a specified, permissible values range, in particular does not undershoot a specified minimum value. The at least one counter is decremented before an execution of the command and incremented only when the command has been executed without interruption. According to the invention, the at least one counter is set even after the issuance of the data carrier to a user. That is, besides the initial setting of the counter upon the manufacture of the data carrier there is the possibility of newly setting the counter when the data carrier has already been put into operation. Within the framework of the present invention a setting of the counter designates a setting of a value of the counter as well as a setting of a permissible values range of the counter as well as of a permissible progression pattern of the counter.

It is self-evident that the counter can also be adapted, analogously to the above-mentioned first variant, according to a second variant such that the specified command is executed only when the at least one counter does not leave the specified values range in the upward direction, i.e. does not overshoot a specified maximum value. Here, the at least one counter is then incremented before the execution of the command and decremented only when the command has been executed without interruption. For reasons of simplicity and understandability, the description and the claims will only refer to the first-mentioned of the two variants, which is completely equivalent to the second variant functionally.

A portable data carrier according to the invention thus comprises at least one memory and a processor which is adapted to execute a command stored in the memory, as well as at least one counter for safeguarding the command. The data carrier is adapted to execute the command only when the at least one counter does not undershoot a specified value. Further, the data carrier is adapted to decrement the at least one counter before an execution of the command and to increment it only when the command has been executed without interruption. According to the invention, the at least one counter is adapted to be settable even after the issuance of the data carrier to a user.

In this way it is possible to enable an authorized body to set the counter at any time. This holds in particular even when the data carrier is already in use. It is thereby possible, on the one hand, to issue the counter to the user with a rather low initial value at the time of issuance. This guarantees a high security of the data carrier and the commands executable thereon. This holds in particular if the user should lose the data carrier, for example through theft. On the other hand, it is possible to raise the counter after some time again by means of a suitable setting, for example to the original initial value, when it has already been reduced, starting out from the initial value, due to inadvertent operating error by an authorized user or due to technical failures. Thus, an unintended blocking of the data carrier can be prevented. This is expedient when the number of inadvertent, authorized operating errors and technical defects that have led to a decrementing of the counter have added up in the course of the employment of the data carrier to a number that would reach the value of the initial value. Thus, the multiple-time counter setting according to the invention makes it possible to prevent the blocking of the data carrier. The operability and reliability of the employment of the data carrier is thereby improved without restricting security.

The counter can, at any time in the life cycle of the data carrier, be kept so low that an attack by a non-authorized party on a specified command is only possible to an extremely limited extent. At the same time, a blocking of the data carrier through occasional, inadvertent or technically induced operating error can be avoided. A counter that is decremented for such reasons can be newly and suitably set even after the manufacture of the data carrier, i.e. even when the data carrier has already been issued to the user and might have been in operation for some time.

As authorized bodies entitled to set the counter, several entities come into consideration. Such a setting can be allowed for example to the user of the data carrier. A body issuing the data carrier can also perform a setting of the counter. Finally, this setting can likewise be performed by the data carrier itself. Further, the requirements that must be fulfilled for the relevant entity to be able to perform a setting can vary. Finally, the value to which the counter is set upon the setting, or the permissible values range, or the permissible progression of the counter, can be freely specified, on the one hand. On the other hand, the newly set values of the counter can depend on external specifications or a previous progression of the counter reading. Different aspects of preferred embodiments of the method according to the invention will be described hereinafter. It must be stressed that these aspects, unless they exclude each other technically, can respectively be combined freely with each other without every possible combination of such aspects having to be explicitly described.

According to a first aspect, the at least one counter can be set after a successful authentication to the data carrier. Only when it is ascertainable to the data carrier without any doubt that the setting of the counter is to be performed at the request of an authorized and authenticatable user or at the request of another authorized and authenticatable body is such setting made possible on the part of the data carrier. The user can authenticate himself to the data carrier here, for example by inputting a secret datum. Such an authentication can be effected "off-line", i.e. without the data carrier being connected to a data processing device which checks the authentication. However, it is possible that the data carrier, if it does not itself have input means, for example a keyboard or the like, is connected to a suitable interface to make possible an input of a secret datum, e.g. a chip-card terminal.

Alternatively or additionally, the user can also authenticate himself to a body issuing the data carrier. This may be for example a bank or a mobile communication provider. It may be provided here that the user sets up a communication connection with the issuing body while employing the data carrier and authenticates himself within the framework of this data communication. The authentication is thus effected "on-line". This authentication likewise requires proof from the user with regard to his authorization. The data carrier alone is not sufficient for this purpose. The user can identify himself to the issuing body for example by means of a secret datum, a biometric feature, by the possession of a further data carrier different from said data carrier, or similar known means.

An authentication of a body issuing the data carrier to the data carrier is effected in the known way when the data carrier is connected to the issuing body "on-line" via a suitable reading device, for example by means of a chip-card terminal. Such an authentication can be effected for example by means of exchanging so-called cryptograms, encrypted data packets. Using these cryptograms the data carrier can authenticate the issuing body.

A second aspect relates to the entity that performs the setting of the at least one counter. Such a setting can normally be effected after successful authentication. This setting can be performed, on the one hand, by the body issuing the data carrier, for example if said body was involved in the authentication. In this way the body can always check and suitably manage the counter reading of issued data carriers. Security and operability of the data carrier can be guaranteed by the issuing body even during the operation of the data carrier "in the field". Thus, the issuing body can check and, where applicable, newly set the reading of the counter for example whenever the user goes "on-line" with the data carrier, i.e. connects to the issuing body via a data communication connection.

Alternatively, a setting of the at least one counter can also be effected through the user himself, preferably after successful authentication of the user to the data carrier or the issuing body. In this way the user can define his own security needs with the setting of the counter. It is possible that the user's setting possibilities are restricted to the effect that settings by the user are only possible insofar as the security of the data carrier is always guaranteed. That is to say, for example, that the initial value of the counter may not exceed a specified value so as not to allow a potential attacker too many attacks on a security-relevant command.

Finally, it is possible that the data carrier itself performs the setting of the at least one counter. This can be effected for example when the user has successfully authenticated himself to the data carrier. This setting can remain transparent to the user, i.e. he does not notice the setting at all. Such a setting, for example respectively to the original initial value, ensures the security of the data carrier and error tolerance for the user upon normal operation, including occasional operating errors.

According to a further aspect, a plurality of counters are provided in the data carrier. A first counter is employed here for safeguarding a first command, and a second counter different from the first counter is employed for safeguarding a second command normally different from the first command. The number of counters can vary. Each of the counters is settable, as described hereinabove, separately. In this way different commands can be safeguarded differently in appropriate fashion. It is possible that the probability of an inadvertent operating error is higher with one command than with another command. Consequently, the associated counter should be newly set more often to avoid an unintended blocking of the data carrier, or at least of the command on the data carrier. Also, it is possible that one command is disturbed due to technical conditions more often than another command. In this case, too, it is advantageous to suitably treat the corresponding counters separately. Accordingly, it is expedient to design the counters that safeguard the corresponding commands so as to be settable separately. In this way each individual command on the data carrier can be safeguarded optimally by means of a separately settable counter specially associated with this command.

This is advantageous particularly when the first counter safeguards a command that is executed in a first operating mode of the data carrier, while the second counter safeguards a command that is executed in a second operating mode of the data carrier. The first operating mode may be for example a contact-type operating mode, and the second operating mode for example a contactless operating mode. If the data carrier is thus adapted to be operated in contacting fashion as well as contactlessly, different counters respectively associated with the different operating modes can advantageously be used. That counter that safeguards a command in the second operating mode is normally respectively set higher and more often newly. This is due to the fact that in this operating mode the power supply of the data carrier is occasionally interrupted for technical reasons, resulting in a decrementing of the counter if the corresponding command has thereby been interrupted. The counter that is associated with a command in the first operating mode which is more stable with respect to the power supply of the data carrier will normally be set lower and less often newly. In both cases the security of the data carrier as well as reliable operability can be guaranteed, while simultaneously taking account of the technical conditions of the two operating modes.

Finally, the different counters that are associated with the different commands can also be set separately to the effect that one command is already in danger of delivering sensitive data to an attacker at a low number of attacks, while the other command is more robust in this regard.

A further aspect relates to the concrete setting of the at least one counter. On the one hand, this refers simply to the value at which the counter is placed upon the setting according to the invention. This may be for example the value at which the counter was originally set upon the manufacture of the data carrier. From this newly set initial value the described decrementing and incrementing of the counter is then effected. However, it is also possible that upon different settings the counter is set to a respective other, new initial value deviating from preceding initial values. In so doing, the past progression of the counter can go into the determination of the initial value to be set.

The aspect of the setting of the at least one counter also relates to more complex relations, however. Upon the setting of the counter in this more complex sense, specifications are made that define the permissible progression of the counter, in particular with respect to a time interval. As mentioned, a setting of the at least one counter also relates to the specifying of a permissible values range which the counter may not leave without the data carrier or the safeguarded command being deactivated. The same holds in general for a permissible progression pattern of the counter. According to this aspect, a permissible range can be provided with a specification that relates to a time interval within which the values range may not be left. It thus becomes possible to define several permissible values ranges in parallel. In so doing, it is possible that the leaving of one of the values ranges within a short specified time interval, e.g. one hour, would lead to a deactivation of the data carrier, while if the counter left this values range for example only after several months this would be regarded as uncritical. Formulated in general terms, these settings specify a permissible ratio of decrementings of the at least one counter to incrementings of the at least one counter for a respective given time span. Such settings can be effected not only after issuance of the data carrier to the user, but also already upon the manufacture of the data carrier.

The ratio can be stated in relative and/or absolute numbers. That is, it is possible to set with respect to a time span, for example one hour, one day, one week, etc., how the ratio of effected decrementings to effected incrementings may be without inferring an attack on the command safeguarded by the counter. It can in this way be set for example that no more than ten directly successive decrementings, i.e. without an incrementing interrupting this sequence at any place, may be effected for any time span. Further, it can be set for example that the number of decrementings may exceed that of incrementings by a specified absolute number, for example 200, or a relative number, for example 5%, within one year. In this way those patterns of decrementings and incrementings that probably result upon known attacks can reliably be set as not allowed, on the one hand. On the other hand, it is possible to set a progression of the counter as is to be expected during an ordinary utilization of the data carrier as permissible.

Above-mentioned time spans can be understood to be absolute time spans, on the one hand. Then the data carrier preferably comprises its own time measuring device which is fed by a separate power source of the data carrier, for example a battery. Alternatively, the specified time spans can also state a strict operating time of the data carrier, i.e. the time in which the data carrier, if it has no power supply of its own, is supplied with power and thus put into operation by an external reading device. A suitable time measuring device of the data carrier then respectively measures this operating time and is also able to store overall operating times. It is also possible that some time spans are measured in absolute time, and others in strict operating time of the data carrier.

According to a further aspect, the at least one counter can also be set in dependence on those data that are ascertained by the data carrier itself. This setting can relate to a concrete value as well as to a setting in the complex sense, as described hereinabove. These data relate in general to the treatment of the data carrier, for example how it is moved during its utilization, which other external forces act on the data carrier, for example pressure or bending forces, and the like. For this purpose, a motion sensor or corresponding other sensors which can capture an action of force on the data carrier can be provided in the data carrier. The idea behind this approach is for example that a data carrier that is attacked by means of advanced technical means by an attacker is normally not moved, at least not randomly, but is substantially held fixed in an apparatus. Thus, a small number of decrementings without any intermediate incrementings accompanied by immobility of the data carrier can already point to an attack. The same number would be regarded as unsuspicious while the data carrier were being moved according to a usual motion characteristic.

In the event that the at least one counter leaves the specified values range, or the permissible ratio of decrementings to incrementings is no longer fulfilled, i.e. is normally overshot, the data carrier or at least the command that is safeguarded by the at least one counter is deactivated. Then no further attacks on the data carrier are possible. Sensitive data cannot get into unauthorized hands. Because an erroneous deactivation of the data carrier or command is virtually excluded according to the invention by the counter being set newly and suitably as required to compensate occasional operating errors or technical difficulties, an attack on the data carrier can be assumed with very high probability upon a deactivation of the data carrier.

DESCRIPTION OF THE DRAWINGS

Hereinafter the present invention will be explained by way of example with reference to the attached drawings. Therein are shown.

DETAILED DESCRIPTION

Figure 1:
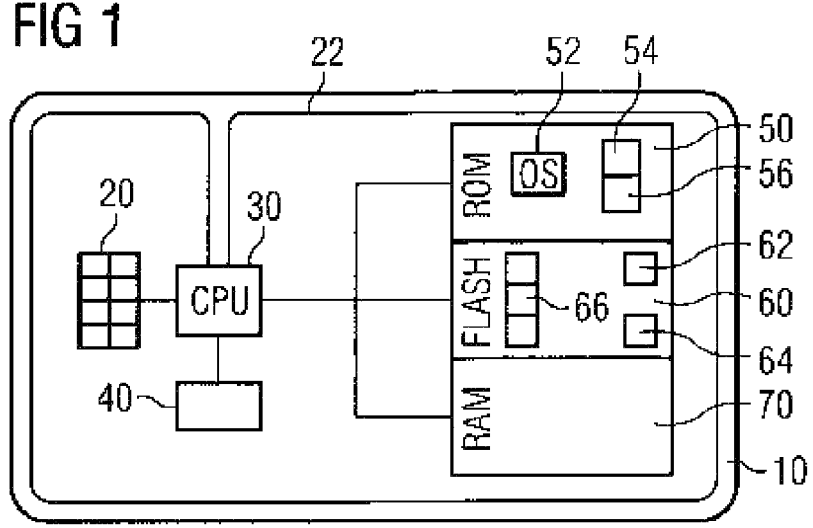
FIG. 1 a preferred embodiment of a data carrier according to the invention.

A portable data carrier 10, which is represented here as a chip card, comprises two different data communication interfaces 20, 22. The first data communication interface 20 is configured as a contact pad. By means thereof the data carrier 10 can be contacted via a contact-type reading device, for example a ordinary chip-card terminal. The second data communication interface 22 serves for contactless data communication and is configured as an antenna coil. The supply of the data carrier 10 with power is respectively effected in the known way via the respective data communication interface 20, 22 in the respective operating mode, contact-type or contactless. It is possible that the data carrier 10 additionally comprises its own power supply, for example in the form of a battery (not shown). Alternatively, the data carrier 10 can also be adapted for only one operating mode, contact-type or contactless.

Further, the data carrier 10 comprises a processor (CPU 30), a row of memories 50, 60, 70 as well as a motion sensor 40.

A non-rewritable, non-volatile ROM memory 50 comprises an operating system (OS) 52 controlling the data carrier 10, as well as applications 54, 56 which are adapted to support the execution of security-relevant commands on the data carrier 10, for example upon an authentication, upon the computation of a cryptographic function, or the like. The operating system 52, or at least parts thereof, as well as the applications 54, 56 can alternatively also be stored in the rewritable, non-volatile flash memory 60. Therein are stored further applications 66, for example different user applications, as well as two counters 62, 64 for safeguarding the security-relevant commands 54, 56. The function of the counters 62, 64 will be described more precisely hereinafter with reference to FIG. 2.

The motion sensor 40 is adapted to recognize a motion of the data carrier 10 and to relay data collected in this regard to a control unit of the data carrier, for example the processor 30 in connection with the operating system 52. The function of the motion sensor 40 and of the thereby recognized motion pattern of the data carrier 10 will likewise be described more precisely hereinafter. Alternatively or additionally, the data carrier 10 can comprise further sensors (not shown) which indicate for example external actions of force on the data carrier 10.

Figure 2:
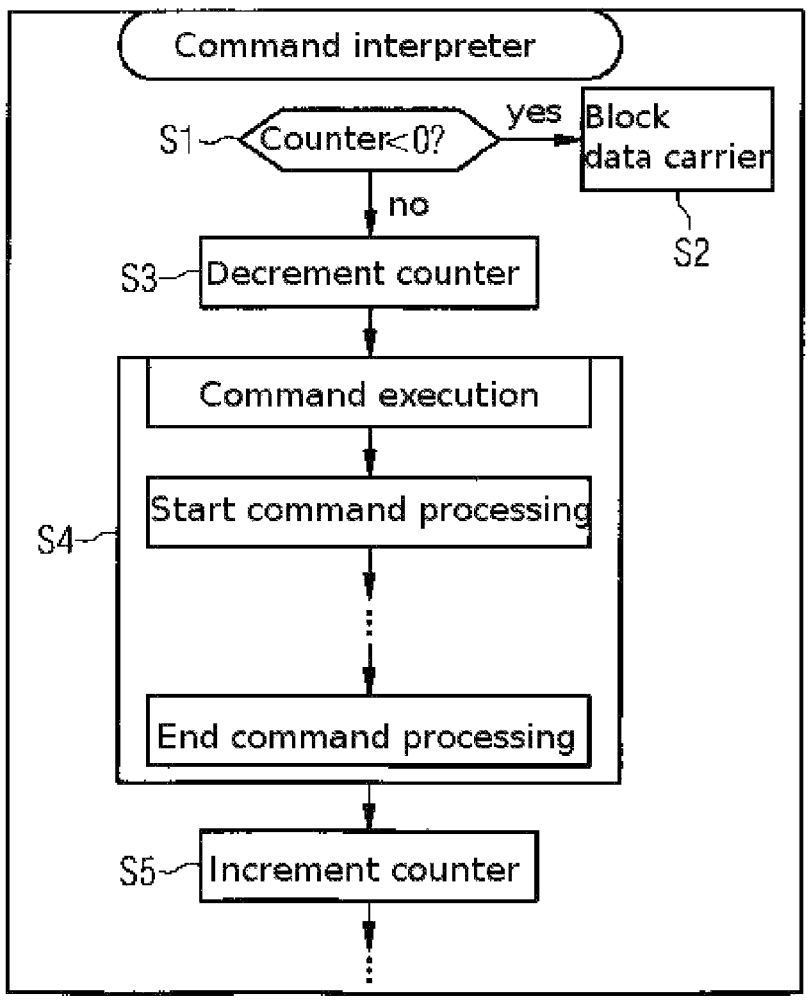
FIG. 2 steps of a method according to the prior art for safeguarding a command by means of an operating error counter.

With reference to FIG. 2 the ordinary employment of a counter 62, 64 for safeguarding a command will be briefly described. When the command for execution is delivered to a command interpreter, it is checked in a first step S1 whether a counter 62, 64 associated with the command still lies above a permissible, specified minimum value, for example "0". If this is not the case, the data carrier 10 is blocked in a second step. That is, a drop of the counter 62, 64 below the minimum value results in a deactivation of the data carrier 10. It is also possible that only the execution of the command that is safeguarded by the counter 62, 64 is blocked, but the data carrier 10 otherwise remains ready for operation.

If the counter 62, 64 still lies within the permissible values range, i.e. above the minimum value here, the counter 62, 64 is decremented before the onset of the execution of the command in step S3, i.e. is normally reduced by the value "1". In the following step S4 the command is then executed. The command processing can comprise several substeps which are not indicated separately here. When the command processing is completely finished, the counter 62, 64 is incremented again in step S5, i.e. normally increased by the value "1". The counter 62, 64 thereby assumes the value that it had assumed before the onset of the last call-up of the command interpreter for executing the command associated with the counter 62, 64. In the event that the processing of the command is disturbed, however, such that the processing of the command aborts before the end of the command processing is reached, the incrementing of the counter in step S5 is consequently also omitted. This holds because the intended sequence in the data carrier 10 is aborted before execution of step S5.

Such an abort of the sequence in the data carrier 10 can be based on an interruption of the power supply of the data carrier 10. This can occur unintentionally, for example when the data carrier 10, being operated in the contactless operating mode, is removed too far away from the corresponding reading device. It is also possible that when the data carrier 10 is operated in the contact-type operating mode a wear or soiling of the contact area 20 of the data carrier 10 or of a corresponding contact area of a reading device results in an interruption of the power supply. Finally, such an unintended interruption can also be based on other technical defects as might occasionally occur.

On the other hand, an interruption of the power supply of the data carrier 10 can also have been caused intentionally. This is the case when an attack on the data carrier 10 or on the specific command of the data carrier 10 is to be concealed by the sequence within the data carrier 10 being interrupted by interruption of the power supply before intra-data-carrier devices can recognize the attack. This kind of concealment of an attack is now prevented by a counter 62, 64 not being decremented only when an attack has been positively recognized, as formerly usual. As described hereinabove, a corresponding counter 62, 64 is now already decremented before the execution of the command to be safeguarded, "preventively", so to speak, and incremented only when no (recognizable) attack has been effected.

An abort of the sequence can, however, also be due to the fact that it is recognized inside the data carrier that no authorization for executing the command is present. This holds for example for an authentication command that is based on the input of a secret datum. If the input secret datum is not correct, the authentication command is aborted before reaching the end, i.e. within step S4. The counter 62, 64 then serves for counting the fruitless authentication attempts. Such an abort can again be caused mistakenly when an authorized user for example only makes a typing error when inputting the secret datum. Upon the attempt of an attacker to guess the secret datum by successively inputting all possible secret data, however, the counter 62, 64 is intentionally decremented by one upon each fruitless attempt. Precisely these changes of the counter 62, 64 are what the attacker actually wants to prevent by the hereinabove described interruption of the power supply.

In the case of an abort of the proper sequence in the data carrier 10, for whatever reason, during the execution of the command, the counter 62, 64 therefore contains a value reduced by one at the next call-up of the command interpreter, as a result of the non-executed incrementing. Starting out from a specified initial value of the counter 62, 64 this value is thus always reduced by one when the execution of the command does not reach the end properly. If the counter 62, 64 thereby drops below the minimum value, the data carrier 10 is deactivated, as mentioned with reference to step S2. That is, if the number of interruptions of the power supply of the data carrier 10 and/or the number of other reasons for aborting that respectively occur during the execution of the command exceeds the initial value, the data carrier 10 or at least the corresponding command is blocked.

To prevent an unintended blocking of the data carrier 10 it would be possible to set the initial value of the counter 62, 64 accordingly high upon the manufacture of the data carrier. However, this would give an attacker the possibility to launch a corresponding number of attacks on the data carrier 10 before the data carrier 10 is deactivated. With every attack there is a higher probability of sensitive data leaving the data carrier 10. If the initial value is set very low upon the manufacture of the data carrier, the latter is protected rather well from external attacks. However, an accordingly small number of unintended operating errors or technical defects can result in an unintended shutdown of the data carrier 10.

For that reason the data carrier 10 is adapted such that the counters 62, 64 can be newly set multiple times, even after the issuance of the data carrier 10 to a user. This holds for the value of the counter 62, 64 as well as for the values ranges within which the counters 62, 64 may move during time spans that are specified or likewise definable upon the setting of the counter 62, 64. The authorization for setting the counters 62, 64 can be granted to a user as well as to a body issuing the data carrier 10. This normally requires a respective authentication to the data carrier 10. Finally, the setting can also be effected through the data carrier 10 itself, for example in dependence on a progression of the counters 62, 64 in the past or in dependence on data of the motion sensor 40. It is further possible that different ones of the stated conditions must be present simultaneously for a setting of the counters 62, 64 to be able to be effected.

The different counters 62, 64 are respectively settable separately. A setting of one counter 62, 64 is independent of the setting of the other counter 64, 62. Thus, different commands can be safeguarded specifically. When for example the counter 62 safeguards a command that is executed in the contactless operating mode, it is expedient to set this counter 62 higher with regard to the initial value than the counter 64 which safeguards a corresponding command that is executed in the contact-type operating mode. Unintended interruptions of the power supply are to be expected more often in connection with the contactless operating mode than in the contact-type operating mode.

A user of the data carrier 10 can carry out a setting of the counters 62, 64 when he authenticates himself successfully to the data carrier 10. This can be effected for example by inputting a secret datum, for example a PIN. For the input of such a secret datum the data carrier 10 can have an input device (not shown), for example a keyboard. It is also possible that, for the input of such data to the data carrier 10, the same is connected via one of the interfaces 20, 22 to a suitable reading device having an input device, for example a chipcard terminal. It is possible that the user can then perform the settings with regard to the counter 62, 64 himself. Alternatively, the data carrier 10 can also restore the setting of the counters 62, 64 to internally specified values as soon as a successful authentication of the user is present.

The setting of the counters 62, 64 can also be carried out by a body issuing the data carrier 10, for example a bank. For this purpose, the data carrier 10 must be connected to this body. This can be done for example via a suitable reading device which is for its part connected to the issuing body, for example via the Internet. To obtain an authorization for setting the counters 62, 64, the issuing body must authenticate itself to the data carrier 10 in the known way. Thereafter it is possible to set the counters 62, 64 according to the specifications of the issuing body. In this case as well, the setting of the counter can be performed by the data carrier 10 itself, after successful authentication of the issuing body. The data carrier 10 can provide for this for example after the respective expiry of a specified time interval. The expiry of the time interval can be taken by the data carrier 10 from an internal time measuring device or a certified time stamp obtained from the issuing body.

As mentioned, the counters 62, 64 can in the simplest case be restored to a specified or newly defined initial value. This is done when a counter 62, 64 has been decremented in the course of the operation of the data carrier 10 on account of unintended misuse or technical conditions such that its current value lies near the minimum value, so that a deactivation of the data carrier 10 as a result of a small number of further decrementings is impending. As mentioned, different counters are set to different initial values in dependence on commands to be safeguarded and the operating mode in which the command is executed.

However, it is also possible to set more complex specifications with regard to the counters 62, 64. It is possible here to specify how the counters 62, 64 may change in the course of the operation of the data carrier 10 without this being seen as an attack on the data carrier 10. Such settings can be effected not only after issuance of the data carrier 10 to the user, but also already upon the manufacture of the data carrier 10. A setting of this kind serves primarily to distinguish those progression patterns of a counter 62, 64 that normally occur upon an ordinary use of the data carrier 10 from those patterns that point to an attack on the data carrier 10. Upon an ordinary use it happens for example that occasionally two, rarely three or more, decrementings of a counter 62, 64 succeed one another before an incrementing of the same takes place again. This is to be ascribed to occasional operating errors of the user and occasional technical defects. By contrast, the pattern of counter progressions that is caused by an attack is usually characterized by many decrementings without intermediate incrementings being observed within a relatively short time. A suitable setting of the counters 62, 64 can make such different patterns recognizable.

For a great time span, corresponding for example to the average useful life of the data carrier 10, it can be specified that the number of decrementings may exceed that of incrementings by a considerable value, for example "1000". This corresponds to the assumption that no more than 1000 operating errors and technical defects are to be expected altogether during the operating time of the data carrier 10. The number of permissible operating errors within a relatively short time period, for example one week, one day, one hour, is accordingly set lower. A permissible operating error corresponds here to the case of two decrementings of a counter succeeding one another directly. If many decrementings succeed one another directly, this points to an attack, for example when a PIN of the data carrier is to be guessed by enumeration of all possible PINS. Such attacks can be easily recognized and prevented by means of the described settings, for example simply by considering more than 10 operating errors within one hour impermissible.

The setting of the counters 62, 64 can, finally, be carried out in dependence on those data that the data carrier 10 senses itself by means of the motion sensor 40 or other internal measuring devices. The first-mentioned data provide information about a motion pattern of the data carrier 10. Other measured values are for example current fluctuations in the data carrier due to contacting difficulties or the like. Certain motion patterns point to an ordinary use of the data carrier 10. These are patterns that show a substantially random motion.

The motion patterns with the changes of the counters 62, 64 that are recognizable parallel in time thereto are to be heeded here. A large number of successive changes of the counters 62, 64 without any recognizable, in particular random, motion of the data carrier 10 between individual decrementings/incrementings of the counter 62, 64 points to an attack. In such a case the data carrier 10 is normally fixed in a suitable apparatus. Therefore, permissible ratios between decrementings and incrementings of a counter 62, 64 are set in dependence on the motion pattern of the data carrier 10. Upon little motion, in particular upon hardly recognizable random motion, strict settings are performed, i.e. the permissible ratios are adapted to the effect that only relatively few decrementings without intermediate incrementings are allowed. Upon recognizably "normal" motion of the data carrier 10, corresponding settings can be relaxed again.

Finally, using measured values collected inside the data carrier an attempt can be made, in particular with a view to attacks that cause an interruption of the power supply of the data carrier 10, to distinguish such attacks from unintended operating errors and technical defects. An interruption of the power supply that directly follows a voltage fluctuation could indicate contacting difficulties, for example due to deficient contact areas, and not so much a targeted attack. This similarly applies to an interruption that directly follows a vigorous motion of the data carrier 10 by which the same has for example been inadvertently removed from the reading field of a contactless reading device.

The invention claimed is:

1. A method in a portable data carrier having at least one counter, comprising the steps:
   executing a specified command by the data carrier only when the at least one counter lies in a specified values range;
   decrementing the at least one counter before an execution of the command and incrementing the at least one counter only when the command has been executed without interruption;
   setting the at least one counter after an issuance of the data carrier to a user; and
   setting the at least one counter with regard to a ratio of decrements of the at least one counter to increments of the at least one counter, said ratio being permissible for a specified time span.

2. The method according to claim 1, including setting the at least one counter after a successful authentication to the data carrier.

3. The method according to claim 2, including authenticating a user and/or a body issuing the data carrier by the user and/or body to the data carrier.

4. The method according to claim 1, including carrying out setting of the at least one counter by a body issuing the data carrier.

5. The method according to claim 1, including carrying out setting of the at least one counter by a user of the data carrier.

6. The method according to claim 1, including providing more than one counter, a first counter being employed to safeguard a first command and a second counter being employed to safeguard a second command.

7. The method according to claim 6, wherein the first counter safeguards a command that is executed in a first operating mode of the data carrier and the second counter safeguards a command that is executed in a second operating mode different from the first operating mode.

8. The method according to claim 1, including setting the at least one counter with regard to an initial value starting out from which the at least one counter is decremented after the setting before an execution of the specified command.

9. The method according to claim 1, wherein the at least one counter is set by the data carrier in dependence on those data that the data carrier ascertains itself.

10. The method according to a claim 1, wherein the data carrier or at least the command that is safeguarded by the at least one counter is deactivated when the at least one counter leaves the specified values range.

11. A portable data carrier comprising at least one memory and a processor which is configured to execute a command stored in the memory, and at least one counter to safeguard the command,
   the data carrier being configured to execute the command only when the at least one counter lies in a specified values range, and to decrement the at least one counter before an execution of the command and to increment it only when the command has been executed without interruption;
   said at least one counter being arranged to be settable after an issuance of the data carrier to a user,
   wherein the data carrier is configured to set the at least one counter with regard to a ratio of decrements of the at least one counter to increments of the at least one counter, said ratio being permissible for a specified time span.

12. The data carrier according to claim 11, wherein the data carrier is configured to execute the steps of:
   executing the command by the data carrier only when the at least one counter lies in the specified values range;
   decrementing the at least one counter before the execution of the command and incrementing the at least one counter only when the command has been executed without interruption;
   setting the at least one counter after the issuance of the data carrier to the user; and
   setting the at least one counter with regard to the ratio of decrements of the at least one counter to increments of the at least one counter, said ratio being permissible for the specified time span.

13. The data carrier according to claim 11, including a sensor that recognizes external influences on the data carrier and the data carrier is configured to set the at least one counter in dependence on those data that are ascertained by the sensor.

* * * * *